US006955157B1

(12) United States Patent
Haskara et al.

(10) Patent No.: US 6,955,157 B1
(45) Date of Patent: Oct. 18, 2005

(54) SYSTEM FOR ENGINE RETARD LIMIT CONTROL

(75) Inventors: Ibrahim Haskara, Westland, MI (US); Guoming G. Zhu, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/930,533

(22) Filed: Aug. 31, 2004

(51) Int. Cl.$^7$ ................................................ F02P 5/145
(52) U.S. Cl. .......................... 123/406.26; 123/406.43
(58) Field of Search .................... 123/406.19, 406.26, 123/406.27, 406.28, 406.29, 406.37, 406.43

(56) References Cited

U.S. PATENT DOCUMENTS

| | | | |
|---|---|---|---|
| 4,809,660 A | 3/1989 | Marsh et al. | |
| 5,005,547 A | 4/1991 | Suga et al. | |
| 5,265,693 A | 11/1993 | Rees et al. | |
| 5,676,113 A | 10/1997 | Johansson et al. | |
| 5,803,047 A | 9/1998 | Rask | |
| 5,896,842 A | 4/1999 | Abusamra | |
| 5,992,372 A | 11/1999 | Nakajima | |
| 6,145,491 A | 11/2000 | Wilstermann et al. | |
| 6,189,317 B1 | 2/2001 | Yasui et al. | |
| 6,474,302 B2 * | 11/2002 | Takahashi et al. | 123/406.21 |
| 6,560,526 B1 | 5/2003 | Matekunas et al. | |
| 6,722,343 B2 * | 4/2004 | Uchida et al. | 123/406.33 |
| 6,742,499 B2 | 6/2004 | Vicle et al. | |
| 6,748,922 B2 * | 6/2004 | Uchida et al. | 123/406.38 |
| 2001/0052335 A1 | 12/2001 | Miyakubo et al. | |
| 2002/0053336 A1 | 5/2002 | Nogi et al. | |
| 2003/0164025 A1 | 9/2003 | Kiess et al. | |
| 2003/0183195 A1 | 10/2003 | Uchida et al. | |
| 2004/0074476 A1 | 4/2004 | Uchida et al. | |
| 2004/0088102 A1 | 5/2004 | Daniels et al. | |
| 2004/0094124 A1 | 5/2004 | Vicle et al. | |
| 2004/0103860 A1 | 6/2004 | zur Loye et al. | |

OTHER PUBLICATIONS

SAE Technical Paper Series, 2000-01-0932; Cylinder-Pressure-Based Engine Control Using Pressure-Ratio-Management and Low-Cost Non-Intrusive Cylinder Pressure Sensors, Mark C. Sellnau, Frederic A. Matekunas, Paul A. Battiston, Chen-Fang Chang and David R. Lancaster, Mar. 6-9, 2002, pp. 1-20.

* cited by examiner

*Primary Examiner*—Hai Huynh
(74) *Attorney, Agent, or Firm*—Brinks Hofer Gilson & Lione

(57) ABSTRACT

The present invention provides a system and method for controlling the retard limit of an engine having one or more cylinders in which combustion occurs. A sensor is employed to detect the ionization of the combustion process in the cylinders. The ionization is related to a retard limit feedback, and the sensor further transmits a signal associated with the retard limit feedback. A controller relates the retard limit feedback signal to a metric, monitors the stochastic behavior of the metric, and adjusts the ignition timing of the engine in response to the stochastic behavior to operate the engine below a retard limit target.

16 Claims, 5 Drawing Sheets

SYSTEM FOR ENGINE RETARD LIMIT CONTROL

BACKGROUND

The present invention generally relates to a system that manages the retard limit in internal combustion engines.

Internal combustion engines are designed to maximize power while meeting exhaust emission requirements and minimizing fuel consumption. In a conventional spark-ignition ("SI") engine, combustion is initiated at the spark plug by an electrical discharge. Recent advances in the powertrain electronic controls ("PCM") make it possible to employ online spark adjustment to optimize the engine operation in terms of power, fuel economy, and emissions. However, the range of ignition timing is often limited by knock in the advance direction and by combustion instability (i.e., partial burn and misfire) in the retard direction. Since the feasible ignition timing range depends on the engine operating conditions, it is desirable to extract online in-cylinder combustion information to optimally adjust the operational boundaries of the engine.

SUMMARY

In satisfying the above need, as well as overcoming the enumerated drawbacks and other limitations of the related art, the present invention provides a system and method for controlling the retard limit of an engine having one or more cylinders in which combustion occurs. A sensor is employed to detect the ionization of the combustion process in the cylinders. The ionization is related to a retard limit feedback, and the sensor further transmits a signal associated with the retard limit feedback. A controller relates the retard limit feedback signal to a metric, monitors the stochastic behavior of the metric, and adjusts the ignition timing of the engine in response to the stochastic behavior to operate the engine below a retard limit target. The stochastic behavior may include the mean, standard deviation, and the stochastic distribution of the retard limit feedback.

The controller may include one or more feed back loops. For example, an adaptive feedback loop may be employed to adjust the retard limit target in response to changing operating conditions. The controller may include a stochastic feedback loop that maintains the mean value of the retard limit at a level to ensure that the retard limit feedback does not exceed the retard limit target. Additionally, an instant correction feedback loop may be employed to avoid engine misfire when the stochastic feedback loop fails to keep the retard limit feedback below the retard limit target.

Although these limits can be imposed in the form of open loop tables through intensive calibrations, among other advantages, the use of an ionization signal as a feedback signal enables optimizing the limits online, such that calibration efforts are minimized.

Further features and advantages of this invention will become readily apparent from the following description and from the claims.

DETAILED DESCRIPTION

Figure 1:
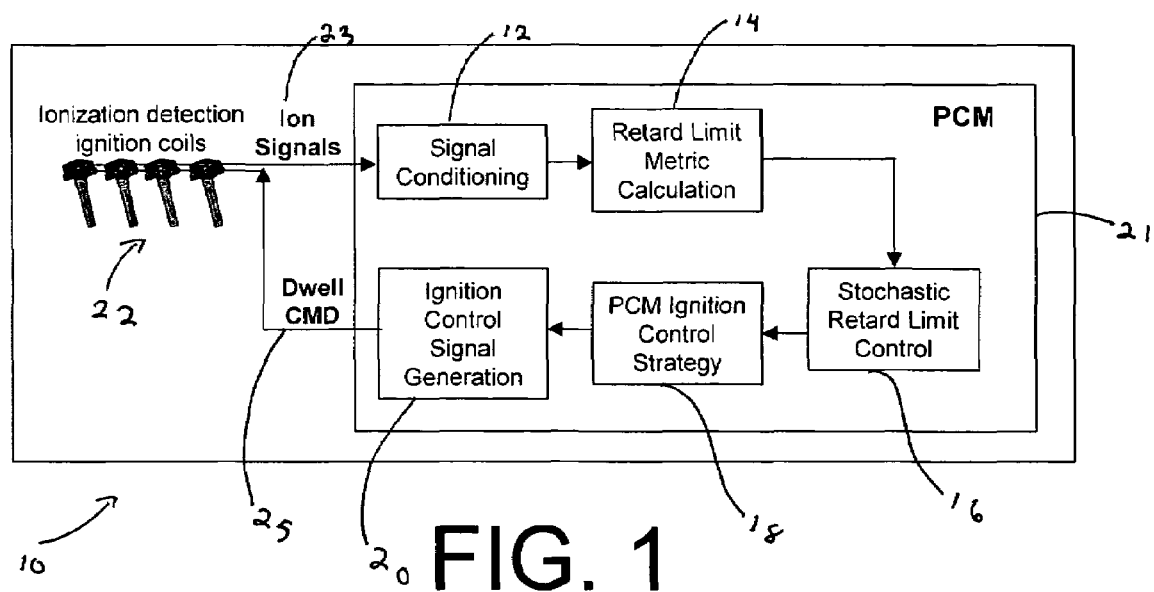
FIG. 1 is a block diagram of a system to control the retard limit in an IC engine in accordance with the invention.

Referring now FIG. 1, a retard limit management system 10, embodying the principles of the present invention, utilizes signals associated with ionization that occur during the in-cylinder combustion process of an engine to maintain the desired combustion quality and prevent the occurrence of misfire under all operating conditions. In this way, the system 10 smoothens the combustion process and minimizes emissions from the engine.

The system 10 implements a stochastic control approach for ignition retard limit management of an internal combustion (IC) SI engine. The system 10 processes an in-cylinder ionization signal to derive a metric for combustion quality and closeness of combustion to partial burn/misfire limit, which is, in turn, used to provide a limiting value for the baseline ignition timing in the retard direction. For normal operations, this assures that the combustion variability is kept within an acceptable range. During start-up operations, the retard limit management further implements a rapid catalyst light-off strategy by maximally delaying the combustion as long as misfire and partial-burn are avoided. This improved start-up strategy reduces cold-start hydrocarbon emissions by reducing the time required to increase the catalysts temperature to its light-off level. The closed loop nature of the system 10 provides maximum usage of the possible ignition timing range in the retard direction in any given operating conditions.

More specifically, during normal operating conditions, if the baseline ignition strategy (that is, the baseline timing to achieve MBT for the best fuel economy) tends to push the timing to a level where the combustion variability is not acceptable, the retard limit management system 10 limits the ignition in the retard direction. Since this limit is continually adjusted by monitoring the combustion process via the in-cylinder ionization signals, different criteria can still be weighted-in and optimized online in determining the final timing instead of using a one-fits-all limit value or map.

Further, during engine warm-up, the retard limit management system 10 seeks the maximum retard possible while assuring that misfire is avoided with the objective of increasing the catalyst temperature rapidly. Delaying the combustion through high values of ignition retard can shorten the time that the catalyst reaches its light-off temperature; therefore, the closed loop control of the air-fuel-ratio becomes effective much sooner and starts reducing tail-pipe emissions. However, if the retard is too high, hydrocarbon emissions become excessive because of due to incomplete combustion, as well as misfire. An open loop retard calibration needs to provide enough margins to avoid misfire at all conditions and therefore is inherently conservative. On the other hand, the closed loop strategy employed in the system 10 alleviates this conservatism by further pushing the timing in the retard direction if things are favorable. In this way, the catalyst light-off time is minimized and tight air-fuel-ratio control can be activated earlier to control tail-pipe emissions most effectively.

The architecture of stochastic retard limit management system is shown in FIG. 1. As its primary components, the system 10 includes a signal conditioning module 12, a knock intensity calculation module 14, a stochastic knock control limit module 16, an ignition control strategy module 18, and an ignition control signal general module 20, all associated with a powertrain control module ("PCM") 21, and a set of ionization detection ignition coils 22 associated with respective cylinders.

Each ionization detection ignition coil 22 provides a single ionization output signal 23, and the signals from all the cylinders are fed into the signal conditioning module 12 where the signals are merged into one or two signals with an analog switch that is based upon combustion event information of the current cylinder. The conditioned signals are then sampled in the retard limit metric calculation module 14 (nominally, at one crank degrees resolution) and processed to determine the ionization first peak location and ionization percentage distribution for each combustion event. This information is sent to the stochastic retard limit control module 16, which determines the appropriate retard limit. The retard limit information is then passed to the ignition control strategy module 18 which instructs the ignition control signal generation module 20 to provide a dwell control input command signal 25 to the cylinders.

Figure 2:
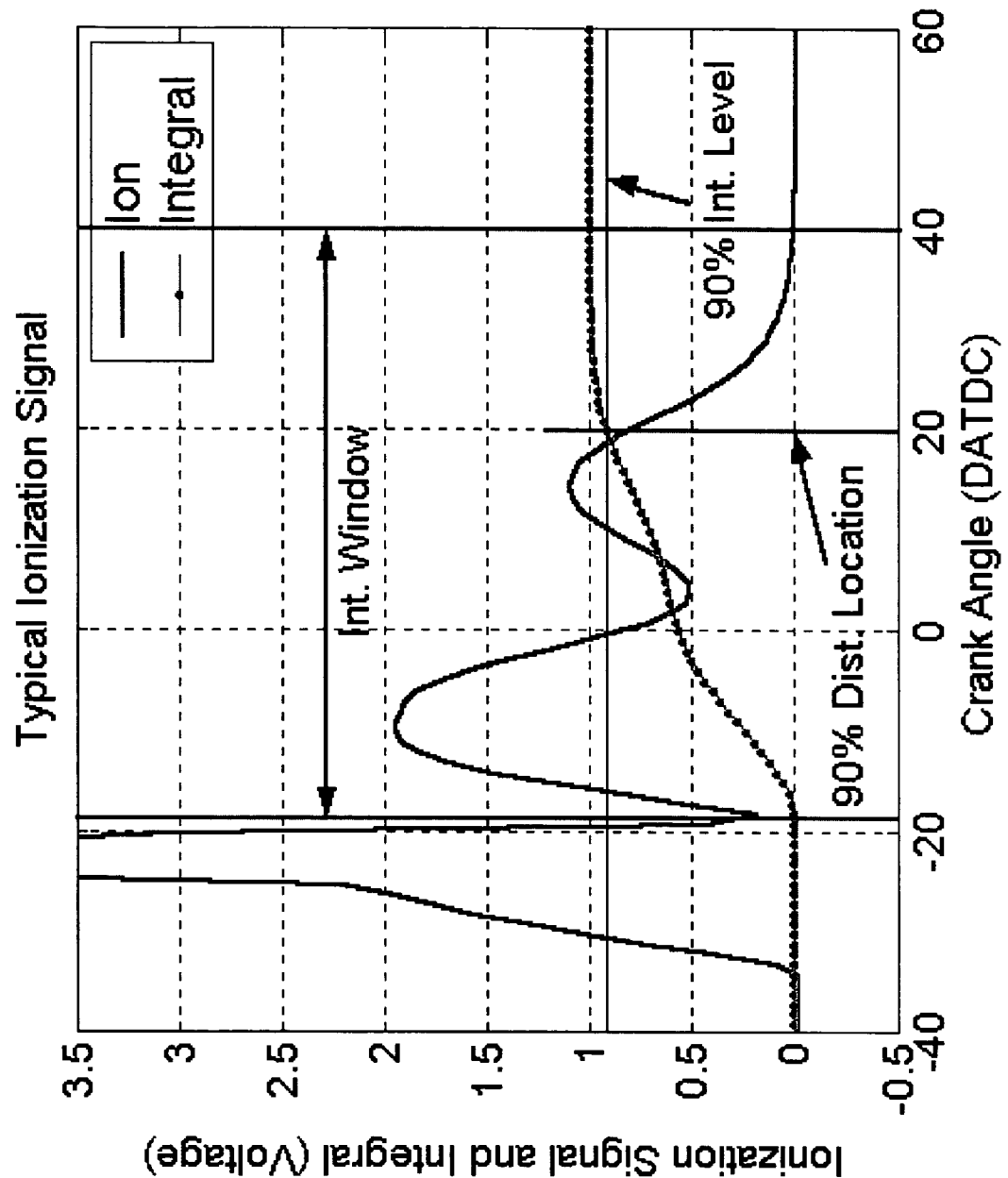
FIG. 2 is a plot of the ionization behavior in a cylinder.

As shown in FIG. 2, the first ion peak location is defined as the crank angle at which the chemical-ionization part of the ion signal takes its maximum value. The ionization signal is also cumulatively integrated over a user-specified window, and the crank angle at which the ion integral reaches a calibratable percentage of the total area is determined. This parameter is referred to as the ionization percentage distribution.

The normalized ion integral is also shown in FIG. 2. It is further possible to use the square integral in this computation instead. The bias level of ionization signal is subtracted in these calculations. Note that, 100% distribution location is ideally reached when the ionization signal completely dies out. A percentage close to 100 is used to approximately locate the crank location after which the ionization signal strength (combustion activity) is minimal. The relative crank location of this parameter can be interpreted to monitor how the combustion evolves at each stroke (expansion and exhaust).

Figure 3A:
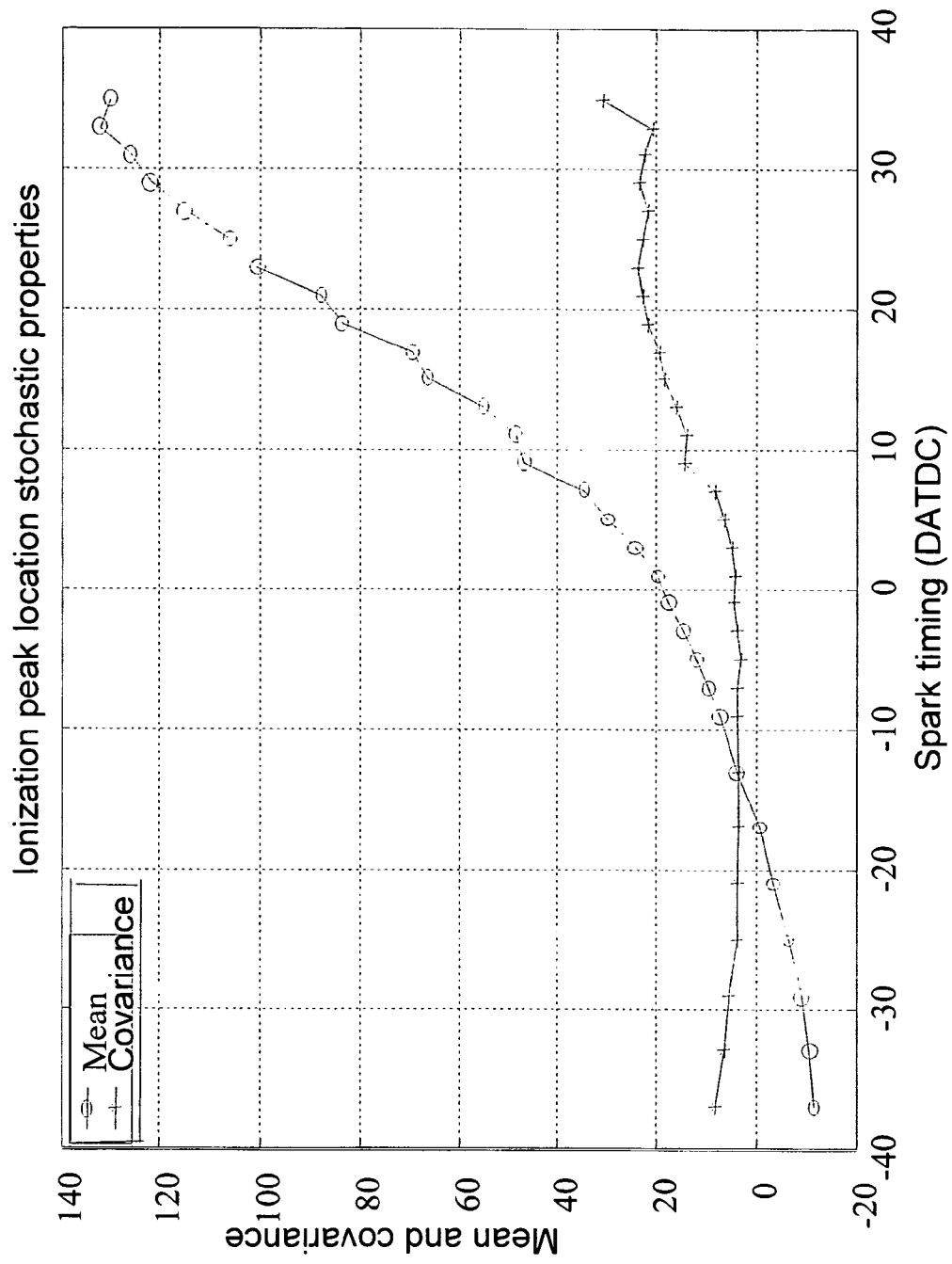
FIG. 3A is a plot of the stochastic behavior of the ionization peak.
Figure 3B:
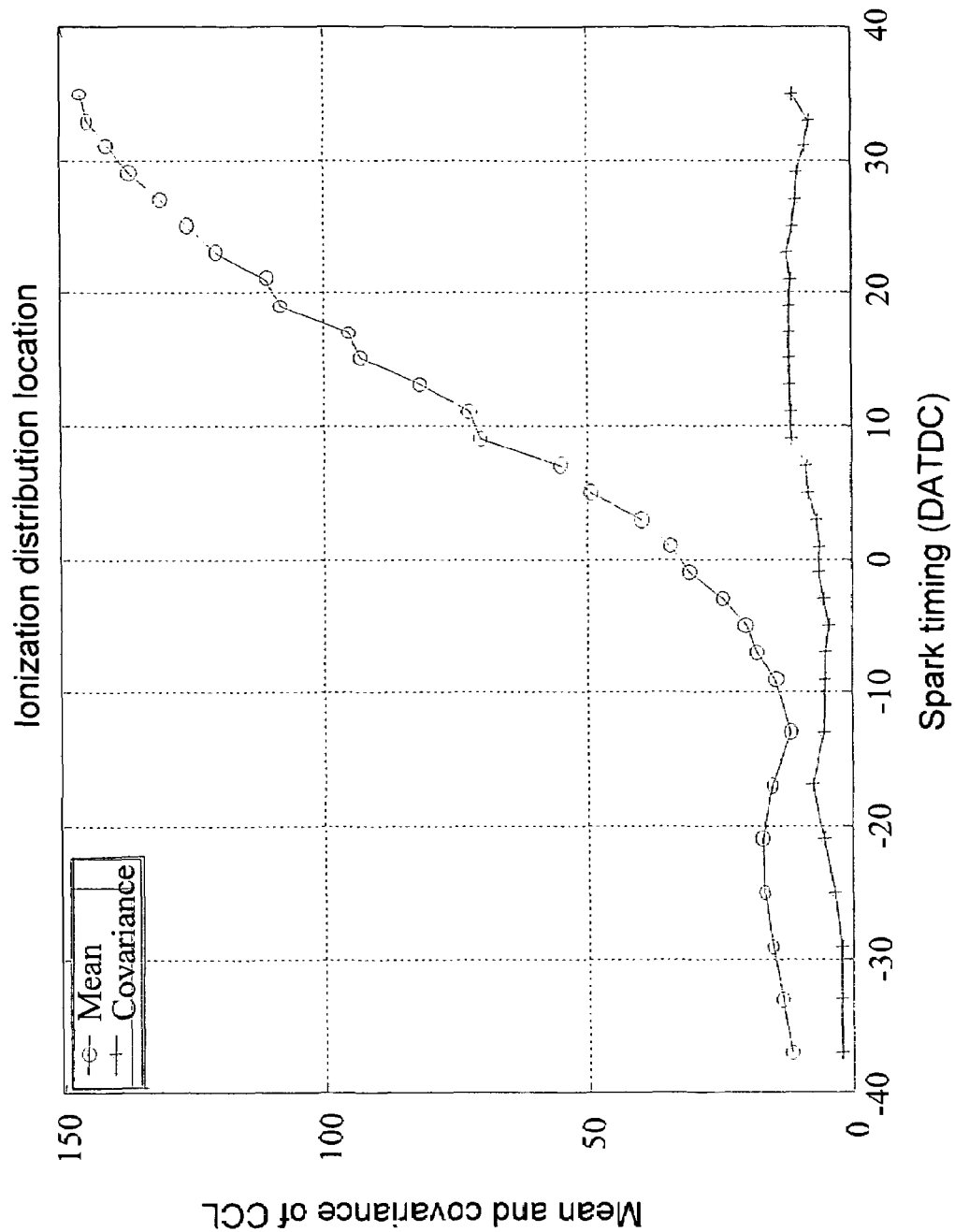
FIG. 3B is a plot of the stochastic behavior of the ionization distribution.

FIG. 3 shows the stochastic properties of the introduced ionization retard limit parameters. Experimentally, it has been observed that these parameters show variations. In fact, the cycle-to-cycle event variation in the combustion process results in a feedback signal that is similar to the output of a random process. The mean value of each parameter increases as the timing is moved in the retard direction, demonstrating good controllability and consistent control gradient. This invention proposes to use not only the raw derived retard limit parameters but also their stochastic properties (mean, variance, as well as the evolution of its stochastic distribution) for closed loop control.

Figure 4:
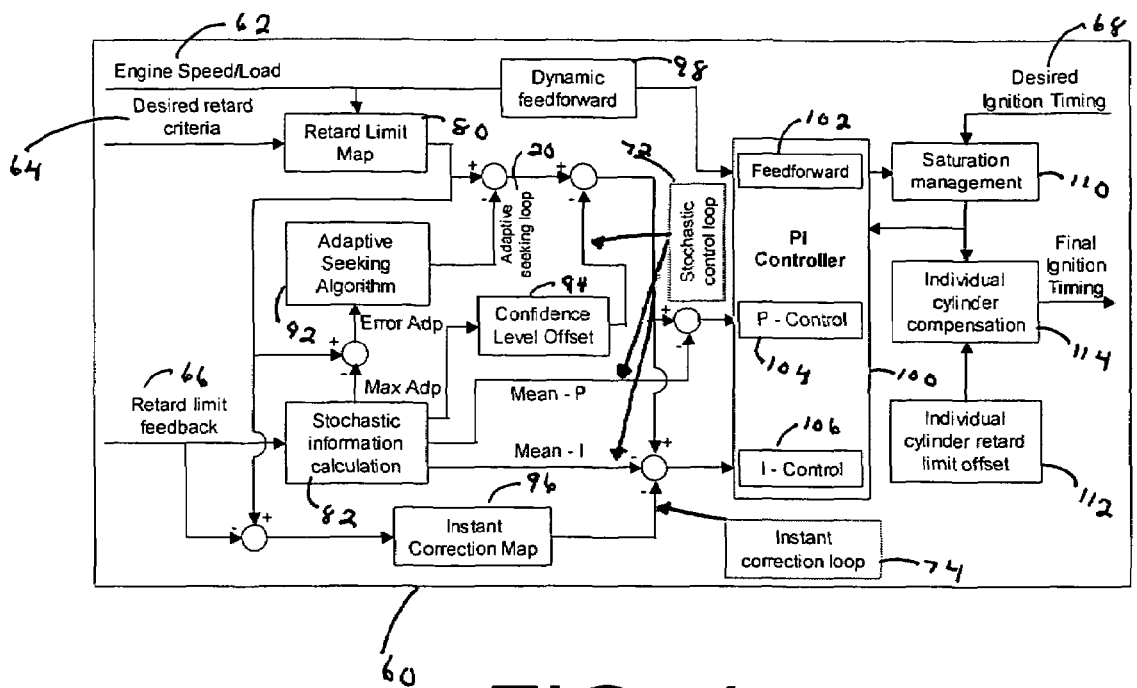
FIG. 4 is a block diagram of a controller of the system of FIG. 1 in accordance with the invention.

Referring also to FIG. 4, there is shown details of a stochastic closed-loop knock borderline limit controller 60 in which the control module 16, the ignition control strategy module 18, and the ignition control signal generation module 20 are implemented. The primary inputs to the controller 60 include:

a) A engine speed/load input 62 associated with the current engine operational speed and load.

b) A desired retard criteria 64 which defines the retard limit target. For normal operations, the maximum allowed combustion variation (COVariance of Indicated Mean Effective Pressure IMEP) is input as a calibration parameter for block 64. For start-up conditions, a less conservative limit target is selected since heating up the catalyst as fast as possible while making sure that no misfire occurs has more weight over the combustion quality.

c) A retard limit feedback signal 66 which is either one or the composite of the derived retard limit parameters from the ionization signal. The feedback signal 66 is a scalar feedback parameter updated at each firing event.

d) A desired ignition timing input 68 which is the signal from the ignition control strategy module 18 based upon the engine MBT ("Maximum Brake Torque") ignition timing for the best fuel economy.

There are three feedback loops associated with the controller 60, in particular, a) An adaptive seeking feedback loop 70 which provides a two-fold purpose: 1) reducing the calibration conservativeness of operating the engine at its "TRUE" retard limit target, and 2) improving robustness of the retard limit controller 60 when the engine is operating at different environments. This is accomplished by using an error signal between the initial desired retard limit 64 and a stochastic criterion, referred to as a distribution maximum value, which is obtained by finding the maximum value of a given distribution (e.g., 90%). For instance, if the given distribution is 90%, 10% of the data in the stochastic calculation buffer is above the calculated maximum value, and the distribution maximum value is the maximal of the remainder of the 90% of the data. The adaptive seeking algorithm 92 described below reduces the desired retard limit when the distribution maximum value is greater than the retard limit; otherwise, it increases the desired retard limit value.

b) A stochastic feedback loop 72 which keeps the mean of retard limit feedback 66 at a certain level. The final retard limit target is obtained by further reducing the initial retard limit target by an offset value generated by the stochastic information calculation block 82 and the confidence level offset block 94 described below. The calculation of the offset value is either based upon the variance of the retard limit feedback or its stochastic distribution. When using the variance, with a given confidence level (e.g., 93.3% of the retard limit feedback is below the desired retard limit), the offset value is based upon the assumed normal distribution function (e.g., for 93.3%, the offset value is three times the variance); and when using the distribution function directly, the offset value is found by locating the given confidence level over the distribution function.

c) An instant correction feedback loop 74 which serves to avoid engine misfire when the stochastic feedback control loop 72 does not prevent the engine from moving beyond its retard limit. Note that this control feedback loop feeds to an integration portion of a PI controller 100 described below.

The controller 60 includes the following components:

1) A retard limit map 80 that includes a lookup table with "engine speed" and "engine load" as inputs. The output from the map 80 is the "retard limit target" that is the product of the lookup table output and the desired retard criteria 64. The map 80 enables the control system 10 to be calibrated for different retard comfort levels at different operating points and conditions.

2) A stochastic information calculation block 82 calculates four key variables used for the three feedback loops 70, 72, and 74 and receives the retard limit feedback as an input. The data is buffered for stochastic analysis with different data lengths. The four outputs are defined as follows:

i) A "distribution max value" defined as the maximum value over a given distribution, where the data is arranged from low to high. For example, if the given distribution is 90 percent, 10 percent of the data will be above the calculated distribution max value, and the distribution max value is the maximal of the remainder of the 90 percent of the data.

ii) A "long standard deviation" defined as the finite standard deviation based upon the actual retard limit feedback 66 with a specific data size, where the data length is relatively longer than the shorter data length defined below in iv).

iii) A "long mean" defined as the calculated mean using the same data length of the long standard deviation iv) A "short mean" defined as the calculated mean using a relatively shorter data length than the longer data length.

3) An adaptive seeking algorithm 92 which utilizes the error between the "retard limit target" from the map 80 and the "distribution max value" to generate the adaptive seeking output by integrating the error over the engine combustion event with a given gain. This adaptation is performed on a much smaller time scale as compared to the control loop. The purpose of the algorithm is to reduce the conservativeness of the stochastic feedback loop 72.

4) A confidence level offset 94 which calculates a confidence offset value to be subtracted from the "retard limit target" after it is corrected by the adaptive seeking algorithm 92. The final target value is the target from the mean regulation loop. The offset value can be determined by: 1) defining the offset value as a given value multiplied by the "long standard deviation"; or 2) making the offset value as a function of the engine speed and load 62.

5) An instant correction map 96 which calculates an instant correction signal to be fed in to the integration portion 106 of the PI controller 100 described below. When the error between the "retard limit target" and the "retard limit feedback" is greater than zero, the output is zero; that is, no correction is required. And when the error is less than zero, the error is fed into a one-dimensional lookup table and the output is set as a negative instant correction signal for the integration portion 106 of the PI controller 100.

6) A dynamic feedforward 98 which includes a two-dimensional lookup table using engine speed and load 62 as inputs and a dynamic controller using the lookup table output as input. The lookup table generates an open-loop borderline retard limit signal as a function of engine speed and load 62, and the dynamic controller consists of a first order controller with a time constant that is a function of engine load rate change.

7) A PI controller 100 with three primary components: a) a feedforward control 102; b) a proportional control 104; and c) an integration control 106. The feedforward control 102 takes the output of the dynamic feedforward block 98 as an input and adds it to the output of the PI controller 100. The input to the proportional control 104 is the error between the "long mean" variable of the stochastic information calculation block 82 and the "retard limit target" signal. This further adjusted by subtracting the offset value obtained from the confidence level offset block 94. The proportional control 104 further multiplies the input with a proportional gain, and adds the result to the PI controller 100 output. Input to the integration control 106 includes both input from the instant correction loop block 74 and the mean error between the "short mean" from the stochastic information calculation block 82 and the "retard limit target" from the retard limit map 80 signal, with the error being further adjusted by subtracting the offset value obtained from the confidence level offset block 94. Note that using a relative "short mean" error for the integration improves the response time.

8) A saturation management 110 which provides an average ignition-timing signal. If the PI controller 100 output is more retarded than the desired ignition timing 68, the output becomes the desired ignition timing 68; otherwise, the output is the output from the PI controller 100.

9) An individual cylinder retard limit 112 which generates an offset vector based upon the retard limit feedback 66. Since the ignition retard limit is different for each individual cylinder, this block 112 calculates the offset value for each individual cylinder so that the global retard limit, generated by the PI controller 100, can be corrected afterwards.

10) An individual cylinder compensation 114 which adds the offset value to the average ignition retard limit generated by the PI controller 100.

In sum, the system 10 utilizes in-cylinder ionization signals to determine a metric for ignition retard limit in terms of the first ionization peak location and the ionization signal distribution. The stochastic properties (e.g., the mean, variance and probability distribution functions) of the peak ionization location and the ionization percentage distribution are correlated to a combustion quality criterion (e.g., the COVariance of Indicated Mean Effective Pressure IMEP) and the combustion type (e.g., the normal, late but complete, partial-burn or incomplete and misfire). A stochastic closed loop controller manages the ignition in the retard direction to maintain good combustion quality at normal operating conditions and applies an aggressive controlled retard limit search during a short time window (e.g., less than 60 seconds) at warm-up.

As a person skilled in the art will readily appreciate, the above description is meant as an illustration of an implementation of the principles this invention. This description is not intended to limit the scope or application of this invention in that the invention is susceptible to modification, variation and change, without departing from spirit of this invention, as defined in the following claims.

What is claimed is:

1. A system to control the retard limit of an engine having one or more cylinders in which combustion occurs, comprising:

a sensor that detects the ionization of the combustion process in one or more cylinders, the ionization being related to a retard limit feedback of one or more cylinders, the sensor further transmitting a signal associated with the retard limit feedback; and a controller that relates the retard limit feedback signal to a metric, monitors the stochastic behavior of the metric, and adjusts the ignition timing of the engine in response to the stochastic behavior to operate the engine below a retard limit target.

2. The system of claim 1 wherein the stochastic behavior includes the mean, standard deviation, and the stochastic distribution of the retard limit feedback.

3. The system of claim 2 wherein the controller includes an adaptive feedback loop that adjusts the retard limit target in response to changing operating conditions.

4. The system of claim 3 wherein the controller includes a stochastic feedback loop that maintains the mean value of the retard limit at a level to ensure that the retard limit feedback does not exceed the retard limit target.

5. The system of claim 4 wherein the mean retard limit is obtained by reducing the retard limit target by an offset value.

6. The system of claim 5 wherein the offset value is based on the variance of the retard limit feedback.

7. The system of claim 5 wherein the offset value is based on the stochastic distribution of the retard limit feedback.

8. The system of claim 4 wherein the controller includes an instant correction feedback loop to avoid engine misfire when the stochastic feedback loop fails to keep the retard limit feedback below the retard limit target.

9. A method to control the retard limit of an engine having one or more cylinders in which combustion occurs, comprising:
  detecting the ionization of the combustion process in one or more cylinders, the ionization being related to a retard limit feedback of one or more cylinders;
  transmitting a signal associated with the retard limit feedback;
  relating the retard limit feedback signal to a metric;
  monitoring the stochastic behavior of the metric; and
  adjusting the ignition timing of the engine in response to the stochastic behavior to operate the engine below a retard limit target.

10. The method of claim 9 wherein the stochastic behavior includes the mean, standard deviation, and the stochastic distribution of the retard limit feedback.

11. The method of claim 10 further comprising adjusting the retard limit target in response to changing operating conditions.

12. The method of claim 11 further comprising maintaining the mean value of the retard limit at a level to ensure that the retard limit feedback does not exceed the retard limit target.

13. The method of claim 12 wherein the mean retard limit is obtained by reducing the retard limit target by an offset value.

14. The method of claim 13 wherein the offset value is based on the variance of the retard limit feedback.

15. The method of claim 13 wherein the offset value is based on the stochastic distribution of the retard limit feedback.

16. The method of claim 12 wherein the controller includes an instant correction feedback loop to avoid engine misfire when the stochastic feedback loop fails to keep the retard limit feedback below the retard limit target.

* * * * *